US007114020B1

United States Patent
Smart et al.

(10) Patent No.: US 7,114,020 B1
(45) Date of Patent: Sep. 26, 2006

(54) SOFTWARE MECHANISM FOR UNIQUE IDENTIFICATION OF SCSI DEVICE

(75) Inventors: James W. Smart, Windham, NH (US); Thomas E. Coughlan, Westford, MA (US); Frederick Earl Knight, Merrimack, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,444

(22) Filed: Apr. 28, 2000

(51) Int. Cl.
*G06F 13/00* (2006.01)

(52) U.S. Cl. .................................. 710/104; 710/10
(58) Field of Classification Search ................ 710/100, 710/1, 2, 3, 104, 8–14
See application file for complete search history.

(56) References Cited

U.S. PATENT DOCUMENTS

| 5,239,632 | A | * | 8/1993 | Larner | 710/314 |
| 5,675,831 | A | * | 10/1997 | Caputo | 710/10 |
| 5,892,929 | A | * | 4/1999 | Welker | 710/100 |
| 6,098,119 | A | * | 8/2000 | Surugucchi et al. | 710/10 |
| 6,269,417 | B1 | * | 7/2001 | Mahalingam | 710/10 |
| 6,343,324 | B1 | * | 1/2002 | Hubis et al. | 709/229 |
| 6,427,176 | B1 | * | 7/2002 | Berglund et al. | 710/8 |
| 6,427,177 | B1 | * | 7/2002 | Chang | 710/8 |

* cited by examiner

*Primary Examiner*—Rehana Perveen
*Assistant Examiner*—Trisha Vu (57) ABSTRACT

The invention, in its various aspects and embodiments, includes a method for uniquely identifying a device on a SCSI bus. The method first queries the device with a first SCSI command to obtain general identification information. Next, a first set of identification information for the device is extracted from the general identification information. A second SCSI command is then determined from the first set of identification information. Next, the device is queried with the second SCSI command to obtain general device identifiers. A second set of identification information for the device is then extracted from the general device identifiers. Then, an unique identifier is formulated from the first and second sets of information.

13 Claims, 5 Drawing Sheets

SOFTWARE MECHANISM FOR UNIQUE IDENTIFICATION OF SCSI DEVICE

BACKGROUND OF THE INVENTION

1. Field of the Invention

The present invention relates to the generation of unique bus device identifiers and, more particularly, to the generation of unique bus device identifiers on a Small Computer System Interface ("SCSI") bus and other technologies using the SCSI command sets.

2. Description of the Related Art

Most types of electronic and computing systems comprise many different devices that electronically communicate with each other over one or more buses. Exemplary types of devices include, but are not limited to, processors (e.g., microprocessors, digital signal processors, and micro-controllers), memory devices (e.g., hard disk drives, floppy disk drives, and optical disk drives), and peripheral devices (e.g., keyboards, monitors, mice). When electrically connected to a bus, these types of devices, as well as others not listed, are all sometimes generically referred to as "bus devices."

A bus, in the conceptually simplest form, is a collection of wires over which the various electronic devices in a piece of electronic or computing equipment transmit information. However, any given bus may be implemented in many different ways. A bus may be implemented so as to transmit only data, or only commands, or both data and commands, for instance. But many more permutations are available based on other operating characteristics, such as bus width and bus speed. These two characteristics are exemplary only, and many other characteristics not listed are considered in designing any particular bus implementation. Occasionally, an industry group will formalize a set of operating characteristics into a "standard." The standard will set flexible definitions for the standard that permit some variation in design but generally ensure compatibility for designs meeting the standard.

One such bus standard is the Small Computer System Interface ("SCSI", pronounced "scuzzy"). There are actually many different kinds of SCSI, each defined by a different SCSI standard. More particularly, at least the following varieties of SCSI are currently implemented: SCSI-1, SCSI-2, Wide SCSI, Fast SCSI, Fast Wide SCSI, Ultra SCSI, SCSI-3, Ultra Wide SCSI, Ultra2 SCSI, Fibre Channel, and Wide Ultra2 SCSI as well as some buses utilizing optical interconnections. Thus, in actuality, there are several SCSI standards and they are not necessarily compatible with each other, although the basic SCSI standards (SCSI-1, SCSI-2, and SCSI-3) are basically functionally compatible. On the other hand, one problem with these standards is that it is hard in many cases to draw the line between them.

Generally, SCSI began as a parallel interface standard used by Apple Macintosh computers, PCs, and many UNIX systems for attaching peripheral devices to computers. The original intent was to develop an interface providing faster data transmission rates (up to 80 megabytes per second) than the standard serial and parallel ports found on computers of the time. However, the SCSI standards proved to be enormously more useful than this original intent. One distinct advantage to the SCSI interface was that it permitted a user to attach many devices to a single SCSI port. Then conventional serial and parallel ports generally were limited to one device per port. SCSI consequently presented numerous advantages, and, not surprisingly many of these greatly facilitated the attachment of peripheral devices for input/output ("I/O") purposes. So, SCSI really was an I/O bus rather than simply an interface.

The various SCSI standards showed still more versatility and have been adapted to large scale computing environments, including networks, both local area networks ("LANs") and wide area networks ("WANs"). One large scale computing application is the implementation of redundant arrays of inexpensive disks ("RAIDs"), which uses multiple arrays of multiple disks to improve performance and enhance reliability. A RAID is essentially a large storage device, and is typically networked to a server or other computer. In this circumstance, both the RAID and the network may both be implemented using SCSI buses, although this is certainly not required.

One thing virtually all SCSI buses have in common, though, is the need to uniquely identify individual SCSI devices in a given implementation. In order for any information to be transmitted to a bus device, it must be uniquely identified in some way to ensure the data is not transmitted to the wrong bus device. Furthermore, in many implementations, certain system resources must be allocated to each bus device, depending upon the make and model of the device. Each bus device should then be uniquely identified in order to control its access to system resources to ensure proper resource allocation and utilization.

Still further, a single system needs to identify the device to recognize when it has multiple paths by which to access the device. The "bus" may include a number of subsidiary buses interconnected by adapters, bridges, and/or port interfaces. Thus, systems need to identify individual instances of multiple devices of the same make or model, which may be cross connected through multiple adapters or via multi-port interfaces. Furthermore, information may sometimes reach its destination over the bus through any one of several paths through the bus. Multiple systems therefore also need to be able to uniquely identify the device so that they may uniformly present the device and coordinate access to the device. Systems desire to make administrative functions to configure, maintain, and service the systems as automatically and transparently as possible to the human operator. Unique device identification allows software subsystems to perform these functions in the manner desired.

Unique identification of SCSI devices has been difficult due to the lack of or poor specification of basic mechanisms for this purpose in the standards. Where mechanisms exist, they offer multiple sets of data, each with differing properties of uniqueness. Some mechanisms are poorly described and allow for multiple interpretations of what the data means. Different revisions of the standards may call out different mechanisms and, in nearly all cases, some or all of the mechanisms are optional for compliance to the standard. Device implementations have complicated this as some vendors have implemented vendor-specific mechanisms, improperly implemented the mechanisms described in the standards, returned erroneous data in response to the mechanisms, or have not provided robust implementations that properly reject unrecognized commands. Some devices return different data depending upon whether media is present or not, what type of media is present, or whether the device has been placed into a ready state or not.

Device identification has typically been based on the physical location of the device. A unique identifier ("UID") in this scheme is typically composed of the adapter that connects to the device, as well as the physical address on the SCSI bus to which the device responds. This physical location is typically specific to a particular system. Hardware implementations have attempted to pre-set the physical address for the device.

A UID based on the device's physical address is problematic, as users may physically move devices, and as several SCSI interconnects allow the physical device address to change due to insertion or removal of other devices or under reset conditions. These changes may occur while a system is using the device or while the system is non-operational. Many unique identification mechanisms have wanted to modify the device's media or non-volatile hardware (if they exist). Many SCSI devices do not allow such implementations. Thus, this scheme tends to be static, and inhibits dynamic configuration (or, reconfiguration) of the system implementing the SCSI bus. Custom hardware has been developed to create vendor-specific components that can be queried by software to determine which components are co-connected, allowing for a rudimentary form of recognition to be performed. Still other identification schemes dictate a specific standards implementation or level of specification, or is only applicable to particular device types.

The present invention is directed to resolving one or all of the problems mentioned above.

SUMMARY OF THE INVENTION

The invention, in its various aspects and embodiments, includes a method for uniquely identifying a device on a SCSI bus. The method first queries the device with a first SCSI command to obtain general identification information. Next, a first set of identification information for the device is extracted from the general identification information. A second SCSI command is then determined from the first set of identification information. Next, the device is queried with the second SCSI command to obtain general device identifiers. A second set of identification information for the device is then extracted from the general device identifiers. Then, an unique identifier is formulated from the first and second sets of information.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention, in its myriad aspects, variations, and embodiments, includes software that creates a unique identifier ("UID") when a device is detected at a particular SCSI address. The mechanism is based on an understanding of which data is most preferred and which data is least preferred, the preferences being implementation specific. Based on this preference hierarchy, the mechanism is able to explicitly determine the scope of the identifier's uniqueness. Essentially, the mechanism sends a series of SCSI commands to the device. Based on the response (or lack thereof) to each SCSI command, the mechanism extracts bits of identification data and selects the most appropriate next command to send to the device to obtain the highest preferred data set possible. In some embodiments, software checks may be made during this process to work around known device defects. In other embodiments, at any point in the process, sufficient data may be obtained such that the mechanism can invoke a device-specific algorithm to complete the identifier.

The identifier may be used to determine the status of a device. More particularly, to determine: (1) if the device is newly connected to the system, thus is to be exported for use; (2) has been previously seen, and thus has another (or now restored) path of access to reach it; or (3) is now located at a SCSI address different from that at which the same device was previously identified. The identifier can be used as a key to be used when coordinating access to the device across multiple systems. Based on the uniqueness scope of the resulting identifier, devices that violate configuration rules can be easily identified. In a cluster, the identifier can be used to identify which hosts in the cluster have access to the device, thus allowing the creation of inter-host routing tables for I/O request. Such tables enable the cluster to provide transparent access to the device from any system in the cluster, regardless of whether the device is attached to the local system.

Figure 1:
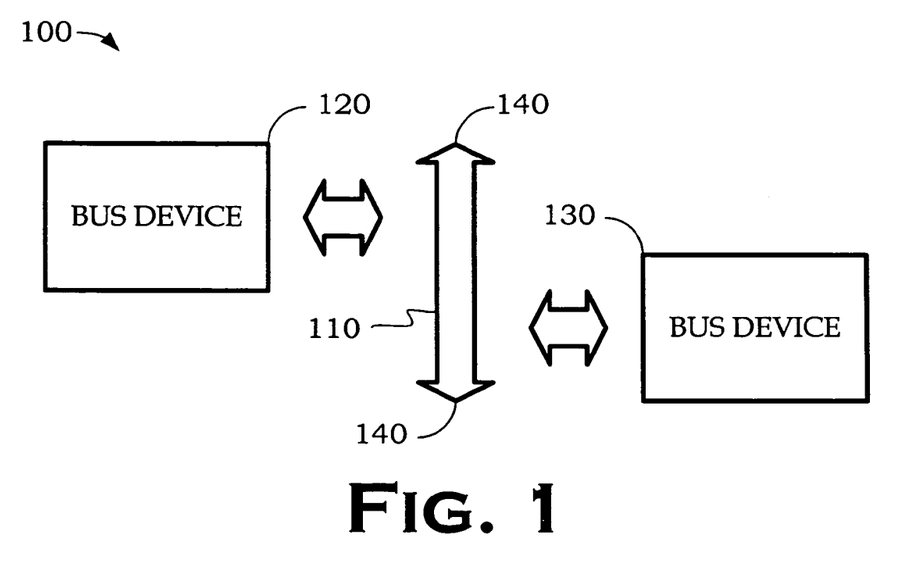
FIG. 1 conceptually illustrates one particular embodiment of a SCSI bus constructed and operated in accordance with the present invention in a block diagram.

Turning now to the drawings, FIG. 1 conceptually illustrates one particular implementation 100 of a SCSI bus 110 constructed and operated in accordance with the present invention. Two bus devices 120, 130 communicate with one another over the SCSI bus 110. The bus devices 120, 130 may be any type of bus device. However, one bus device will typically be an "active" bus device (e.g., a processor or controller), and usually will be a SCSI host adapter. The active device is capable of executing the instructions to perform the software implemented process of the invention. This bus device is known as a "host adapter." Furthermore, a second bus device may be a memory device (e.g., a hard disk drive, floppy disk drive, or optical disk drive) on whose memory element (e.g., the hard magnetic disk, floppy magnetic disk, or optical disk) those same instructions are stored, although this is not necessary to the practice of the invention. The bus devices 120, 130 may be either external or internal devices.

The SCSI bus 110 may be implemented under either the SCSI-2 or the SCSI-3 standards, but the invention is not so limited. For present purposes, a "SCSI bus" is any bus implementation employing the SCSI command packets. The SCSI bus 110 is deployed in a bus "topology", or configuration in which the bus devices, e.g., the bus devices 120, 130, are connected to a central bus, e.g., the SCSI bus 110. Furthermore, the bus devices 120, 130 are daisy chained over the SCSI bus 110, i.e., connected to at least one, but no more than two, other bus devices. The SCSI bus 110 may, in some embodiments, also support device identification in a "Plug and Play" ("PnP") context, or "hot swapping" of devices. This is sometimes also referred to as SCSI Configured Automatically ("SCAM") and differs from PnP operating systems in that it deals with device identification rather than resource allocation. This feature allows new devices to be added or exchanged for old devices without setting configuration parameters that identify the device within the configuration of the apparatus 100.

Certain aspects of the SCSI bus 110 are not apparent from FIG. 1 but will be appreciated by those in the art by virtue of its description as a "SCSI bus." Most notably, the SCSI bus 110 in any given implementation will include a terminator at either end 140 of the SCSI bus 110. The terminators, like the bus devices 120, 130, may be either external or internal. In fact, in the illustrated embodiment, bus devices 120, 130 are found at the ends 140 of the SCSI bus 110 and may act as terminators if they have internal terminators. Otherwise, terminators (not shown) may be provided expressly for this purpose. Note that, if the SCSI bus 110 supports PnP or hot swapping, the bus devices 120, 130 may automatically enable or disable this termination ability depending on their position on the SCSI bus 110. The termination may be any one of a passive termination, an active termination, and a forced perfect termination. Still other aspects that will be readily recognized and understood by those skilled in the art having the benefit of this disclosure are also omitted for the sake of clarity and so as not to obscure the invention.

Note also that the SCSI bus 110 illustrated in FIG. 1 is but one implementation of the present invention. Alternative embodiments might manifest significant physical variation and yet constitute a "SCSI bus" as defined above. Thus, alternative embodiments might employ different types of devices and interconnections than those in FIG. 1. The identity of the bus devices and the physical manifestation of the interconnections will depend on the type of technology being deployed, as will be appreciated by those skilled in the art having the benefit of this disclosure.

The apparatus 100 is operated under the control of an operating system, which can be any operating system known to the art. Computers typically employ "operating systems" to manage the resources they employ during their operation. Computers generally perform their most basic functions in accordance with their operating system. An operating system is a program that runs other programs known as "applications programs," such as a word processor, invoked by the computer's user. The operating system also performs the elementary tasks associated with the computer's use, such as receiving input from the keyboard, sending output to a display or a printer, and controlling peripherals such as disk drives and printers. In some computers, the operating system might perform advanced tasks, such as maintaining security. Exemplary operating systems currently used include Windows®, the Microsoft Disk Operating System (MS-DOS), OS/2, Linux, and UNIX.

Figure 2:
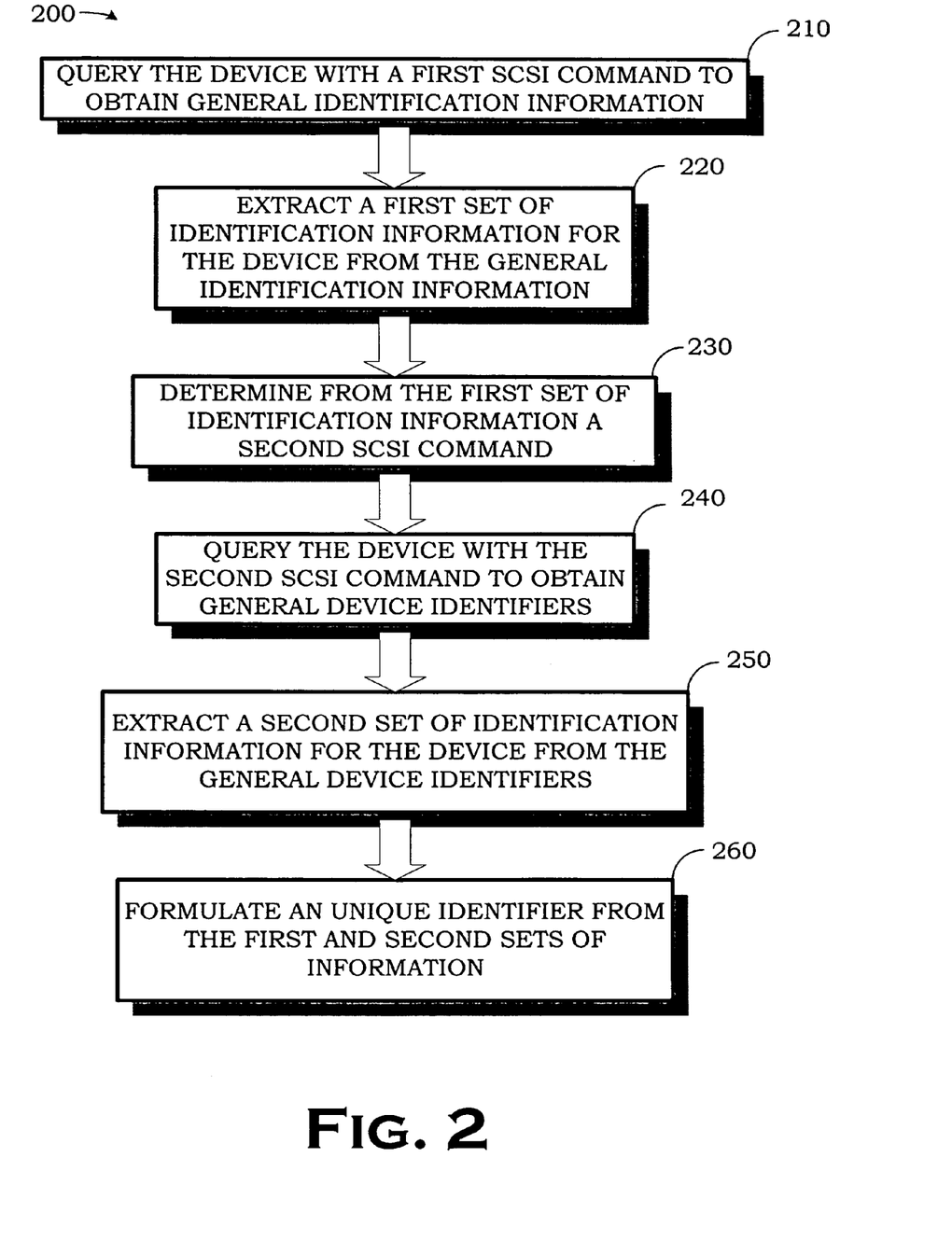
FIG. 2 depicts one implementation of a method practiced in accordance with the present invention.

FIG. 2 depicts one implementation of a method 200 practiced in accordance with the present invention. The method 200 is performed as part of the Basic Input/Output System ("BIOS"). The BIOS, very generally, is a built-in program that determines what the computer can do without accessing programs from a storage device. The BIOS serves as an intermediary between the operating system and the hardware and is loaded and executed before the operating system software. The BIOS contains or identifies all the software needed to control the hardware, such as device drivers. In SCAM systems, the BIOS also collects information about the computer's devices that is necessary for the operating system to self-configure. This information typically includes the identity of the device and the resources it needs to function properly.

When the apparatus 100 is initialized, the BIOS is loaded from memory and executed. Part of the BIOS identifies and collects information about the devices on the bus 110. In implementing the present invention, the BIOS invokes the process 200 and performs it to uniquely identify each of the devices 120, 130 on the bus 110. Thus, the process 200 is invoked upon initialization of the apparatus 100. Depending on the particular implementation, this may be at power-on, reset, or reboot.

Referring now to both FIGS. 1 and 2, the process 200 begins when the device 120 queries the device 130 with a first SCSI command to obtain general identification information, as set forth in the box 210. Exemplary "general identification information would include, for example and without limitation, the vendor identification ("VID") and/or the product identification ("PID"). This type of generic identification information is typically stored in the device itself by the vendor and/or manufacturer of the device and is programmed to. The identity of the command that may be used to elicit this information may be implementation specific. For instance, in an embodiment implementing SCSI-2 or SCSI-3 buses, the Inquiry VPD Device Identification Page (0x83) command may be used.

Next, the device 120 extracts a first set of identification information for the device 130 from the general identification information, as set forth in the box 220. The extracted information might comprise all or any part of the general identification information provided by the device 130, depending on the implementation. For instance, a VID or a PID will typically include information identifying the vendor that is assigned by some industry accepted authority and information provided by the vendor for a variety of reasons. In various implementations, one or the other, or both, pieces of information might be used in the process 200.

The method 200 proceds by determining from the first set of identification information a second SCSI command, as set forth in the box 230. As noted above, the present invention is predicated on an understanding of which data is most preferred and which data is least preferred in terms of identifying the device. Generally speaking, it is preferred to use general identification information that has been filtered through some authorized entity over, for example, a physical addressing. However, as will be appreciated by those skilled in the art, this will not always be possible, and the general identification information provided in response to the first command will provide a good indication of whether this is true.

To a large degree, the implementation of the bus 110 and second device 120 will drive the determination of the second command. The standard that the bus 110 is implemented under may define the commands that are available for selection. For instance, in a SCSI-2 or SCSI-3 bus, the second command may be the Inquiry VPD Unit Serial Number Page (0x80), which may not be available in other buses implemented under other standards. The identity of the bus device 120 will determine what kinds of information can be gleaned about it through a software implemented process such as the process 200. Some devices simply will not be amenable to a "virtual" UID through this process such that resort must be had to physical addressing. Some devices will therefore need specific handling routines. Thus, the determination of the second SCSI command will turn on (1) the commands that are available, and (2) the nature of the particular device being queried.

The process 200 then continues by querying the device with the second SCSI command to obtain general device identifiers, as set forth in the box 240. The process 200 then extracts a second set of identification information from the response, as set forth in the box 250. From the first and second sets of extracted identification information, the process 200 then formulates the UID, as set forth in the box 260.

Note that the method 200 calls for the issuance of only two commands, i.e., the first command and the second command as set forth in the boxes 210, 240. However, the invention is not so limited. Depending on the particular implementation, it may be desirable in alternative embodiments to utilize more than two commands. Some embodiments may also utilize different numbers of commands to identify different devices on the same bus. For example, some devices may be identifiable in two commands while others are identifiable in three or four commands.

Some portions of the detailed descriptions herein are presented in terms of a software implemented process involving symbolic representations of operations on data bits within a computer memory. These descriptions and representations are the means used by those skilled in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantifies. Unless specifically stated or otherwise as may be apparent, throughout the present disclosure, discussions utilizing terms such as "processing," "computing," "calculating," "determining," "displaying," or the like, refer to the action and processes of an electronic device, that manipulates and transforms data represented as physical (electronic) quantities within the electronic device's memory into other data similarly represented as physical quantities within the memory or other such information storage, transmission or display devices.

Figure 3:
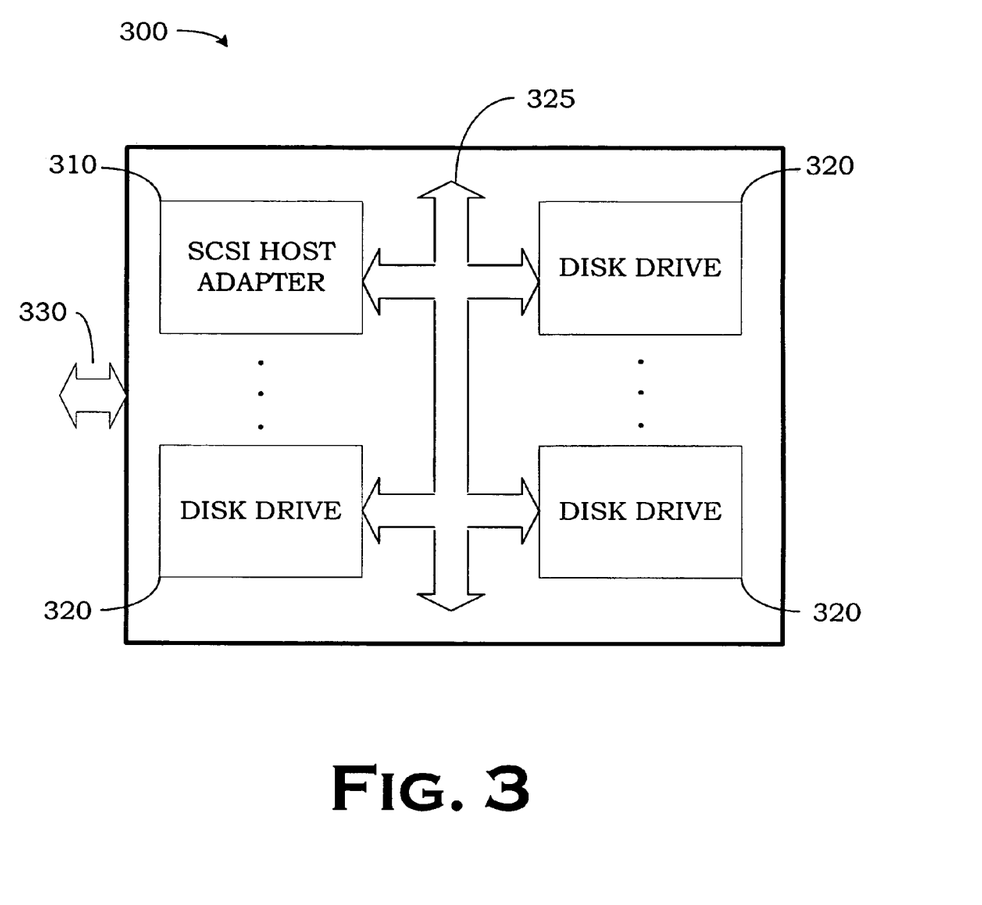
FIG. 3 illustrates one implementation of the SCSI bus in FIG. 1 in a mass storage device known as a redundant array of inexpensive disks ("RAIDs")

Turning now to FIG. 3, one particular implementation of the embodiment in FIGS. 1–2 is conceptually illustrated in a functional block diagram. This particular implementation is a mass storage unit 300 and, more particularly, a redundant array of inexpensive disks ("RAID"). This technology uses multiple disks in a single unit in conjunction with one another to improve performance and enhance reliability. A RAID improves both performance and reliability by storing data onto multiple physical disk drives. Reliability is improved through redundancy of information, and performance is improved by exploiting the fact that multiple disks are available for use.

Note that there are several alternative, standard RAID implementations as well as many derivative or proprietary versions. The standard alternatives include:

RAID 0, also known as "striping without parity," in which information is stored in "stripes" across multiple disk drives, i.e., part of the data is written to a first drive, another part to a second drive, etc. This provides parallel access to enhance access times during writes to and reads from the memory. However, there is little or no redundancy, which hampers data protection. Consequently, some authorities do not technically categorize this as a RAID implementation.

RAID 1, also known as "mirroring," in which every write to the array performed to at least two disks in its entirety. This produces as many exact copies of the written information as there are writes to separate disks.

RAID 5, or "striping with parity," which stripes information across the disks like RAID 0, but with parity information. The parity information can be used to reconstruct any lost data in the event that one of the disks in the array fails.

The RAID 300 may be implemented in any of these standard alternatives or in some proprietary or other non-standard implementation.

The RAID 300 includes a SCSI host adapter 310, a plurality of disk drives 320, and a pair of terminators (not shown) on each end of a SCSI bus 325. The SCSI bus 325 is implemented under either the SCSI-2 or SCSI-3 standard. The SCSI host adapter 310 and the disk drives 320 are all "bus devices" such as the bus devices 120, 130 shown in FIG. 1. Typically, the RAID 300 will be deployed as part of a network, and so the RAID 300 may communicate with the rest of the network (not shown) over the network connection 330. The number of disk drives 320 will be implementation specific. The SCSI host adapter 310 performs an implementation of the method 200 in FIG. 2 to assign UIDs to each of the disk drives 320.

Figure 4A:
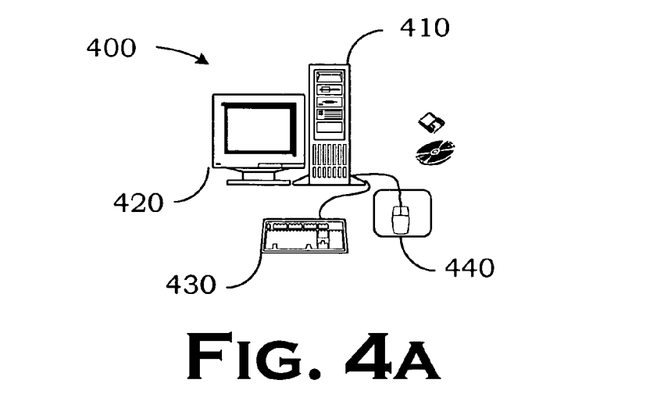
FIGS. 4A and 4B illustrate one implementation of the SCSI bus in FIG. 1 in a network server.
Figure 4B:
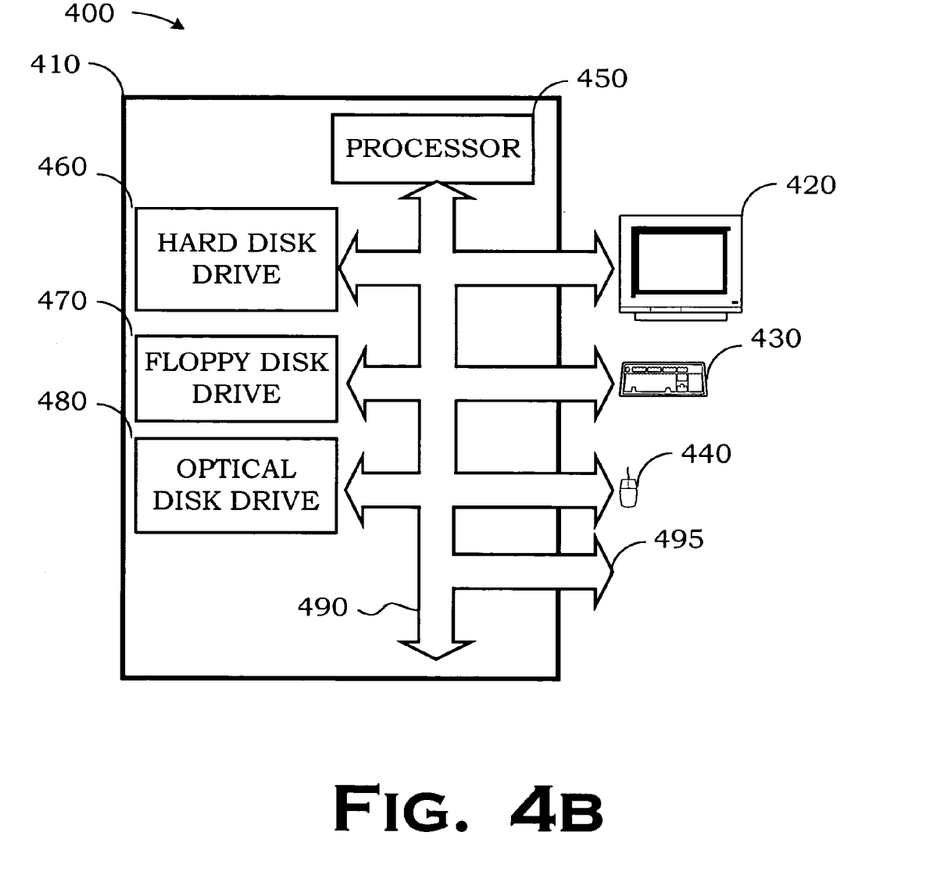

Turning now to FIGS. 4A–4B, a second particular implementation of the embodiment in FIGS. 1–2 is illustrated. This particular implementation, first shown in FIG. 4A, is a network server 400, including a tower 410, a monitor 420, a keyboard 430, and a mouse 440. As illustrated in FIG. 4B, the tower 410 houses a processor 450 that communicates with a hard disk drive 460, a floppy disk drive 470, and an optical disk drive 480 over a SCSI bus 490. The processor 450 also communicates with the monitor 420, keyboard 430, and mouse 440 over the SCSI bus 490. Each of the processor 450, hard disk drive 460, floppy disk drive 470, optical disk drive 480, monitor 420, mouse 440, and keyboard 430 are bus devices, such as the bus devices 120, 130 in FIG. 1. The processor 450 performs an implementation of the method 200 in FIG. 2 to assign UIDs to each of these bus devices. The processor 450, and hence the server 400, can communicate with other network devices over a network connection 495.

Figure 5:
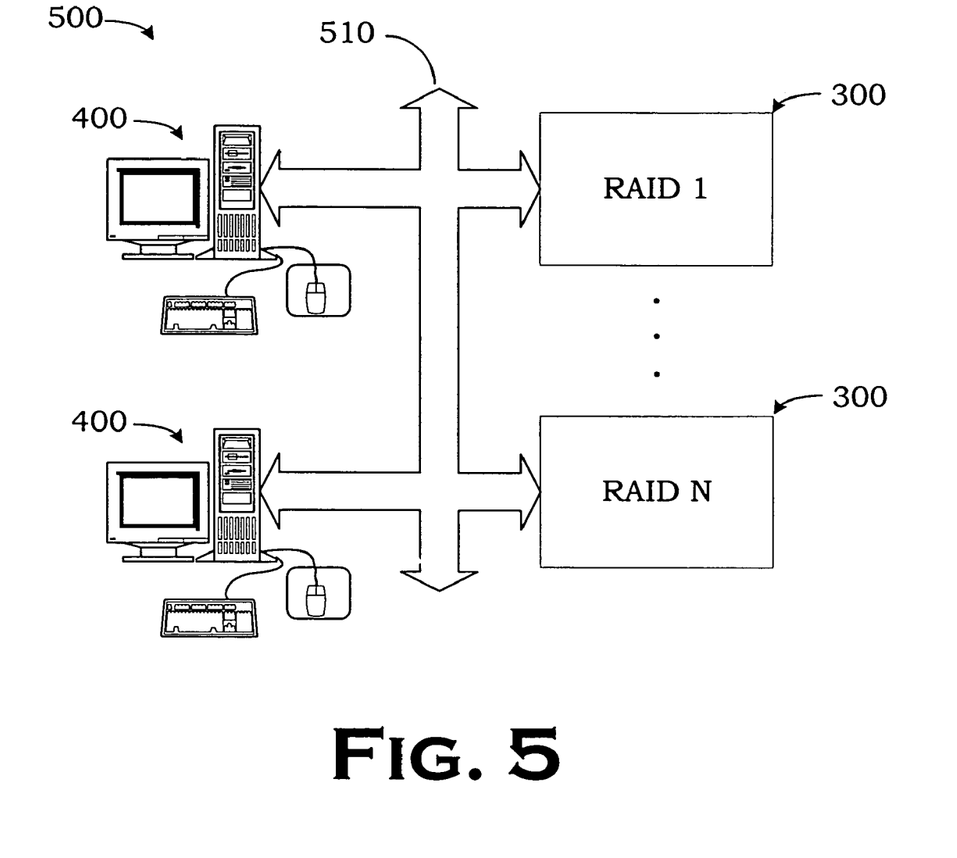
FIG. 5 illustrates one implementation of the SCSI bus in FIG. 1 employing the server of FIGS. 4A–4B and the RAID of FIG. 3.

Turning now to FIG. 5, one particular implementation of the embodiment in FIGS. 1–2 is illustrated. This particular implementation is a network 500, including at least two servers 400, such as that shown in FIGS. 4A–4B, and at least two mass storage units, such as the RAID 300 in FIG. 3. The servers 400 communicates with the mass storage units 300 over the network bus 510, which is a SCSI bus as defined above. The network employs a UNIX-based operating system in the Tru64 common access method ("CAM") architecture that controls the operation of the SCSI bus 510. The SCSI bus 510, itself, may implement either a SCSI-2 or a SCSI-3 bus and employs the SCSI commands defined in the standards. In this particular embodiment, the UID is referred to as a "world wide identifier" ("WWID"). Each of the servers 400 performs a method in accordance with the present invention, discussed more fully below, to uniquely identify the mass storage units 300.

More particularly, this implementation employs the Standard Inquiry Command and either the Inquiry VPD Device Identification Page (0x83) or the Inquiry VPD Unit Serial Number Page (0x80) as the first and second SCSI commands, respectively. The Standard Inquiry Command will return the vendor identification, product identification, revision, device class type, and sometimes serial number ("S/N") data from a SCSI bus device. The Inquiry VPD Device Identification Page (0x83) allows for up to 255 bytes of description information. There may be several description elements contained within, and the descriptors may be ASCII or binary information. However, this may vary by implementation. For instance, FC devices will contain a single identifier up to 128 bits in length. The Inquiry VPD Unit Serial Number Page (0x80) allows for the device to return up to 255 bytes of ASCII serial number data. If the serial number data is not available, ASCII spaces (0x20) will be returned.

Some hardware characteristics limit this particular implementation, and several exemplary characteristics are set forth. Since OS support for the VPD pages is sometimes lacking, most vendors placed serial number information into the Standard Inquiry data in the vendor specific region. Also, many disk devices do not return S/N data unless the media is spun up. Although the specification indicates to supply spaces if S/N is unavailable, many vendors have not followed the specification—either returning spaces, nulls, or their own custom ASCII string. Removable media devices, specifically disk or compact-disc read only memory ("CD ROM") devices, do not return S/N data until media is mounted. Additionally, the S/N data may be different for each piece of media.

Consequently, this particular implementation assumes that:
  there are devices attached to the bus that will not support the Inquiry VPD Device Identification Page (0x83);
  there are devices that will respond to the Page 0x83, and that they return multiple description elements;
  there are devices that will respond to the Page 0x83, but they will return improper data (e.g., all zero's) for the identifier;
  there are devices that will hang if unsupported commands are sent to them;
  in addition to devices that will not support the Page 0x83, there are devices that will be attached that will not support the Inquiry VPD Unit Serial Number Page (0x80);
  there are devices that will return a Serial Number in the vendor specific area of the standard Inquiry data;
  In addition to devices that will return a Serial Number in the vendor specific area, there are devices that will not supply serial information in the vendor specific area of the standard Inquiry data;
  there are some interconnects which can give us WWD's for Targets;
  many disk devices will return "empty" identifiers until the media is spun up (as the identifier is saved onto the media);
  removable media devices typically will return "empty" (non-unique identifiers) if media is not loaded;
  removable media devices may report different identifiers depending on the type of media loaded;
  because of the removable media devices that return empty identifiers, we cannot use descriptor data to identify the devices and these identifiers will need to built from physical address components;
  because of devices that will not supply serial information in the vendor specific area and due to interconnects which can give us WWID's for Targets not being universal, there will be devices that we cannot tell apart;
  all devices that cannot be determined independent of physical address components must be restricted from cluster configurations; and
  there are devices that do not follow the specification when returning unspecified data (e.g. instead of spaces, they return nulls).

The following pseudo-code states one implementation of the present invention in this embodiment based on these assumptions. In the pseudo-code, the acronym <B/T/L> refers to the Bus Target Lun (or "Logical Unit"), which is a device's physical address.

---

```
Obtain generic Inquiry data (for VID/PID information).
If the device bypass logic indicates there is a device-specific method to
obtain the identifier, then:
    Invoke that method to create the WWID.
RETURN
Endif.
If the device is *not* a removable media random access device and
    the device bypass logic does not disable obtaining
    VPD descriptors, then:
    If this is a random access device and device bypass logic allows
        START_UNIT commands, then:
        Send the device a Test Unit Ready.
        If the device is not ready, then:
            Send the device a Start Unit.
        Endif.
    Endif.
Endif.
Request the VPD Cmd support Data information.
If the device supports Page 0x83, obtain the page 0x83 data, then:
    If it contains a ID type 3, NAA 0110 identifier:
        Create the WWID from the identifier data.
        RETURN
    Endif.
    If it contains an ID type 3, NAA 0101 identifier:
        Create the WWID from the identifier data.
        RETURN.
    Endif.
    If it contains an ID type 3, NAA 0010 identifier:
        Create the WWID from the identifier data.
        RETURN.
    Endif.
    If it contains an ID type 3, NAA 0001 identifier:
        Create the WWID from the identifier data.
        RETURN.
    Endif.
    If it contains a ID type 2 identifier.
        Create the WWID from the identifier data.
        RETURN
    Endif.
    If it contains a ID type 1 identifier.
        Create the WWID from the Product Id and identifier data.
        RETURN
```

-continued

```
Endif.
  All other identifier pages should be ignored.
Endif.
If the device supports Page 0x80, obtain the page 0x80 data:
  if device bypass logic indicates a vendor-specific inquiry, then
    Data placement or need for additional parameters such as device
      type, Lun number, etc.
      Create the WWID from Vendor Id, Product Id, the Unit S/N, and any
        other needed parameters.
    else:
      Create the WWID from Vendor Id, Product Id, and the Unit S/N.
    Endif
    RETURN
  Endif
Endif
<we are about to default to B/T/L>
Contact the host adapter to obtain a persistent Identifier for the target (e.g.,
  if FC - ask for the N_Port Name/Id).
If the adapter is on a FC interconnect:
  The adapter shall return the N_Port PortName value.
Else, if the adapter is on a SCAM interconnect:
  The adapter shall return the device id used by the device for the SCAM
    protocol
Else:
  No identifier shall be returned.
Endif
If the adapter returns a persistent Identifier
  Create the WWID from the Vendor Id, Product Id, Device Type, Lun
    Number, and Target Identifier
Else
  Create the WWID from the Vendor Id, Product Id, Device Type,
    Bus Number, Physical Target Id, and Lun Number
Endif
RETURN
```

There are several restrictions in this particular implementation, namely:
  devices that resolve to <B/T/L> will not be allowed to be on a shared SCSI bus in this particular embodiment, and an informational message shall be sent whenever a device resolves to a WWID of <B/T/L> to indicate that properties of device movement are not supported;
  CD-ROMs typically do not support any of the VPD pages or S/N data in the inquiry string and are not allowed on a shared bus unless it is behind an array controller which does respond with valid device id or serial number data.
  many tape devices that do not supply device information and will not be allowed on a shared bus in this implementation unless it is behind an array controller which does respond with valid device id or serial number data
  removable media devices do not return S/N data unless media is present, and the S/N data may change with the media. Thus, Removable media devices will default to either TGT_IDENT or BTL based WIDS. Unless the removable device supplies a TGT_IDENT identifier (e.g., on an interconnect that does have a unique id for the target), it shall not be allowed on a shared bus.
  the mechanism above does not double-check that the S/N data is valid (e.g. not spaces/NULLs/known strings). Should we do this, and what is the action if we do match this scenario. (Note: we do check for some invalid patterns that have been known to occur)

Also, note that this embodiment clearly contemplates using two commands to identify some devices and more than two commands to identify other devices.

In this particular embodiment, the actual formulation of the unique identifier will depend on which command is issued in the second query. The Inquiry VPD Device Identification Page (0x83) will return a 128 bit binary value that can be copied verbatim as the UID. The Inquiry VPD Unit Serial Number Page (0x80) will return the serial number, which can then be concatenated with one or more of the vendor identification, product identification, and device class received from the Standard Inquiry command to produce the UID. In one particular embodiment, the UIDs are also provided with header specifying the type of the UID and an indication of its length.

As discussed above, the network 500 includes multiple servers 400, each running the same implementation of the process 200 in FIG. 2. Each server 400 will independently generate the same UID for each bus device on the network 500. This is particularly useful in large computing environments where resources are clustered, and only certain resources are allowed access to certain other resources, depending upon the clustering. Note, however, that only a single server 400 may be employed in some alternative embodiments.

Thus, the software mechanism creates an identifier that will repetitively and uniquely, within a set of identifiable boundaries, identify a SCSI device. The mechanism is functional across multiple and possibly disparate systems. The mechanism is applicable to any SCSI-2 or SCSI-3 device, of any device type (disk, tape, etc.), of any level of standards adherence, and can be tailored to a specific device's implementation. The mechanism functions with older (and possibly retired) SCSI implementations, the new SCSI-3 implementations, and with varying implementations of the multiple standards. The mechanism does not require modification of the SCSI devices, their implementation, or their attached media. The mechanism also does not rely upon custom hardware or vendor-specific implementations. Furthermore, the mechanism is in nearly all cases independent of physical locality; and provides for extensions to be added to tailor to the explicit behaviors or implementation of a device, if necessary.

The particular embodiments disclosed above are illustrative only, as the invention may be modified and practiced in different but equivalent manners apparent to those skilled in the art having the benefit of the teachings herein. For instance, the present invention may be employed in non-SCSI technologies nevertheless implementing SCSI buses, i.e., buses that receive SCSI command packets. One example of this type of technology is Advanced Technology ("AT") Attachment Packet Interface ("ATAPI"). Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A system comprising:
  a processor coupled to a bus; and;
  a first device coupled to the bus at any one of a plurality of locations in the system;
  wherein the processor queries the device to retrieve general identification information from the first device and extracts a first set of identification information from the general identification information, uses the first set of identification information to determine a command that queries the device to retrieve general device identifiers from the first device, and generates a unique identifier for the first device based on the general identification information and the general device identifiers, the same unique identifier being generated for the first device at different bus locations within the system;

wherein said generated unique identifier is used by the system to control access to the first device.

2. The system of claim 1 further comprising a second device coupled to the bus at any of a plurality of locations in the system, and wherein the processor generates a unique identifier for the second device that is different than the unique identifier for the first device and that is independent of the second device's location within the system.

3. The system of claim 1 wherein the device comprises a Small Computer System Interface (SCSI) device.

4. A method comprising:

querying a device to obtain general identification information;

extracting a first set of identification information associated with said device from the general identification information;

with a command determined from the first set of identification information, querying the device to obtain general device identifiers;

extracting a second set of identification information for the device from the general device identifiers; and formulating a unique identifier from the first and second sets of identification information, said unique identifier being independent of location of the device within a system and being used to control allocation of resources of the system to the device.

5. The method of claim 4 further comprising determining the command from the first set of identification information.

6. The method of claim 5 wherein querying the device to obtain general identification information comprises querying the device to obtain data selected from a group consisting of vendor data, product data, and device serial number.

7. The method of claim 4 wherein extracting the first set of identification information includes extracting data selected from a group consisting of vendor data, product data, and device serial number.

8. The method of claim 4 wherein formulating the unique identifier includes generating the unique identifier based on one or more values selected from a group consisting of device serial number, vendor data, and product data.

9. The method of claim 8 wherein the general identification information and the general device identifiers comprise said one or more values.

10. The method of claim 4 further comprising coupling the device to different bus locations in the system and formulating the same unique identifier for the device at each of the different bus locations.

11. A storage medium containing executable code that, if executed by a processor, causes the processor to:

retrieve general identification information from a device;

extract a first set of identification information from the general identification information;

determine a command from the first set of identification information;

use the command to query the device to retrieve general device identifiers from the device; and generate a unique identifier for said device based on the general identification information and the general device identifiers, said unique identifier being independent of location of said device within a system in which the device is used;

wherein said generated unique identifier is used to control access to the device.

12. The storage medium of claim 11 wherein the general identification information and the general device identifiers used to generate the unique identifier comprise at least one value selected from the group consisting of product data, vendor data, and serial number.

13. The storage medium of claim 11 wherein the executable code causes the processor to generate the same unique identifier for said device when said device is at different locations within the system.

* * * * *

UNITED STATES PATENT AND TRADEMARK OFFICE
CERTIFICATE OF CORRECTION

PATENT NO.        : 7,114,020 B1
APPLICATION NO.   : 09/561444
DATED             : September 26, 2006
INVENTOR(S)       : James W. Smart et al.

It is certified that error appears in the above-identified patent and that said Letters Patent is hereby corrected as shown below:

In column 10, line 1, delete "WWD's" and insert -- WWID's --, therefor.

Signed and Sealed this

Twenty-first Day of July, 2009

JOHN DOLL
*Acting Director of the United States Patent and Trademark Office*